United States Patent [19]

Bartlett et al.

[11] Patent Number: 4,510,980
[45] Date of Patent: Apr. 16, 1985

[54] TABLE ASSEMBLY FOR A MULTIPURPOSE TOOL

[75] Inventors: Robert L. Bartlett, Dayton; Robert N. McKee, Huber Heights, both of Ohio

[73] Assignee: Shopsmith, Inc., Dayton, Ohio

[21] Appl. No.: 552,599

[22] Filed: Nov. 16, 1983

[51] Int. Cl.³ .................................................. B21C 9/02
[52] U.S. Cl. .................................. 144/1 C; 144/287; 269/61; 269/88
[58] Field of Search ................. 144/1 R, 1 C, 286 R, 144/286 A, 287, 288.5; 108/61, 92, 106, 147; 74/89.12, 422; 269/88, 61

[56] References Cited

U.S. PATENT DOCUMENTS

| | | | |
|---|---|---|---|
| 2,927,612 | 3/1960 | Edgemond, Jr. et al. | 144/1 C |
| 3,282,309 | 11/1966 | Parker et al. | 144/1 R |
| 4,349,945 | 9/1982 | Fox | 144/1 R |

*Primary Examiner*—W. D. Bray
*Assistant Examiner*—Jorji M. Griffin
*Attorney, Agent, or Firm*—Biebel, French & Nauman

[57] ABSTRACT

A table assembly for a multipurpose tool is used in combination with a tool of the type having a frame, a pair of parallel way tubes mounted on the frame, a headstock mounted on the frame having a motor driven spindle, and releasable pivots which allow the way tubes to be pivoted about their ends to a substantially vertical positions. The table assembly includes a table top, a pivot mounted beneath the table top, a pair of support legs having racks on opposite sides thereof and attached to the pivot, and a carriage, mounted on the way tubes, having channels to receive the support legs. A pair of pinion gears are positioned within the channels to mesh with the racks and are driven by a crank having a locking mechanism so that the table can be displaced relative to the carriage. The table top can be pivoted to a position so that it is perpendicular to and faces an axis of the output spindle in a drill press mode, or the support legs can be removed from the channels in the carriage, and the table and support legs reversed in position relative to the carriage so that the table faces away from the spindle in an under-the-table shaper mode.

14 Claims, 13 Drawing Figures

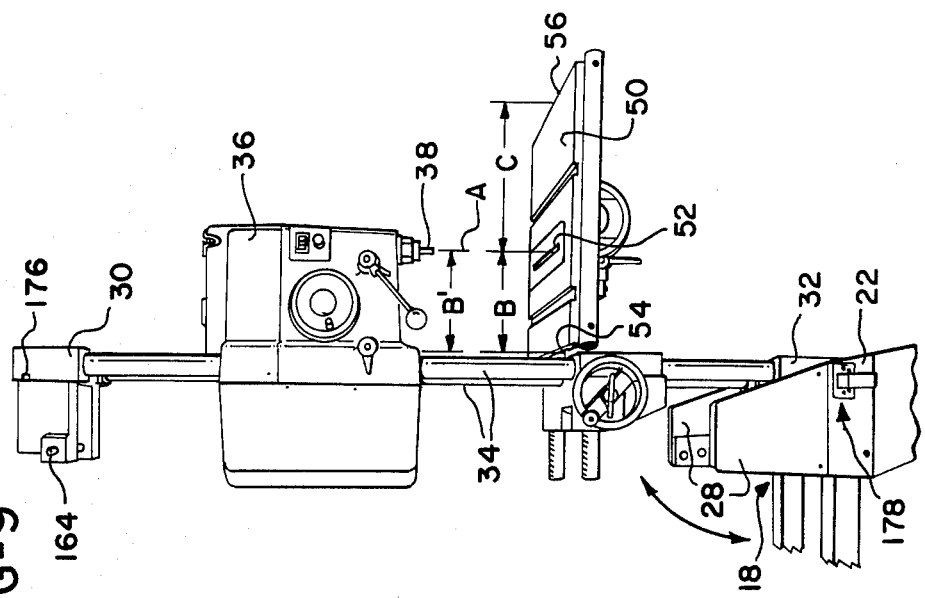
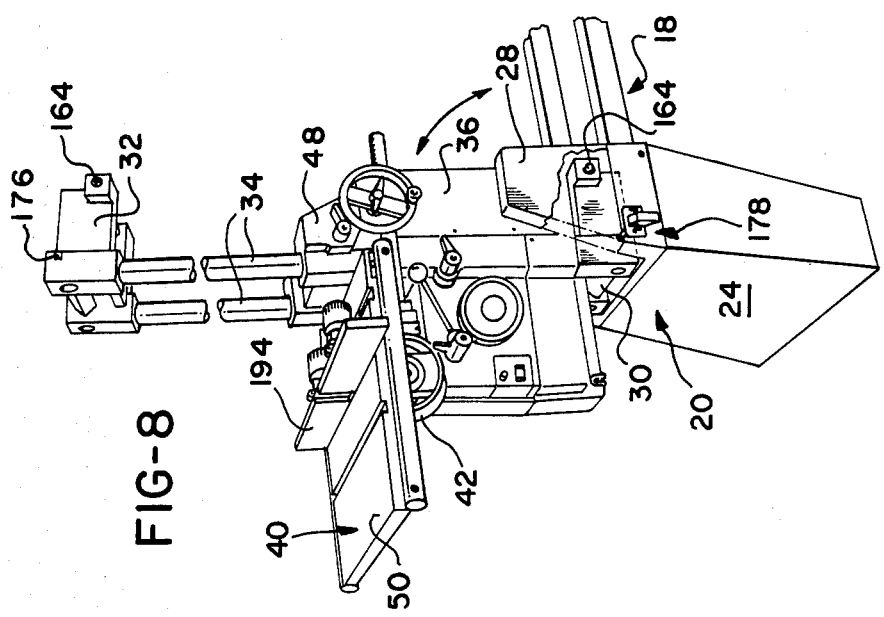

TABLE ASSEMBLY FOR A MULTIPURPOSE TOOL

BACKGROUND OF THE INVENTION

The present invention relates to motor-driven tools and, more particularly, to motor-driven multipurpose woodworking tools.

In the design of multipurpose woodworking tools, it is desirable to provide a tool which can be adjusted to perform as many different types of woodworking operations as possible. Often, however, the greater the number of woodworking functions a multipurpose tool can provide, the less each function can be performed efficiently and conveniently by an operator. For example, Parker et al. U.S. Pat. No. 3,282,309 discloses a multipurpose woodworking tool which includes a base, a frame having a pair of parallel way tubes mounted on the base, a headstock mounted on the way tubes and having a motor-driven quill spindle, and a table pivotally mounted on support legs which are adjustably attached to a carriage slidably mounted on the way tubes. This tool is capable of functioning as a table saw, a disc sanding machine, a lathe, a horizontal boring machine, a vertical drill press and an under-the-table shaper.

The vertical drill press and under-the-table shaping functions are made possible by pivot mounts which connect the way tube frame to the base of the tool. When pivoted about one end of the way tube frame, the way tubes are swung to a substantially vertical position so that the headstock is located above the table and carriage assembly. The table, normally oriented parallel to the way tubes, is then pivoted about its support legs to a position in which it faces and is perpendicular to an axis of the quill spindle, and the carriage adjusted in position on the vertical way tubes so that the table is spaced an appropriate distance from the quill spindle. The table can be positioned so that the transverse saw blade seat is in registry with the quill spindle so that a drill bit held by the spindle may pass through the plane of the table.

When the way tube frame is pivoted about the opposite end, the way tubes are again oriented substantially vertically but the headstock is located below the table assembly. To complete the adjustment to the under-the-table shaping mode, the table is pivoted substantially 90° from a position parallel to the way tubes, or 180° for the drill press orientation, in a direction opposite that for the drill press mode, so that the table is perpendicular to and faces away from the quill spindle axis. To complete the adjustment, the carriage is moved toward the headstock so that the quill spindle of the headstock projects upwardly through a transverse slot formed in the table.

In order to pivot the table to a drill press position in which it faces and is perpendicular to the axis of the quill spindle, as required in the drill press mode, it is necessary that the distance from the table slot to a transverse end of the table adjacent the way tubes not exceed the distance from the spindle to the way tubes, so that the slot can be placed in registry with the spindle. Conversely, in order to pivot the table to an under-the-table shaping position in which it faces away from the quill spindle, it is necessary that the distance from the table slot to an opposite transverse end adjacent the carriage not exceed the distance from the quill spindle to the top surface of the carriage, since the quill spindle must protrude through the table slot when the tool is adjusted to perform an under-the-table shaping operation.

As a result, in order to provide a multipurpose tool which can perform both vertical drill press and under-the-table shaping functions, these dimensional constraints severely limit the length of a table as measured in a direction parallel to the way tubes.

An attempt to remedy this problem was made in the design of the tool of the Parker et al. patent. That tool included a work table provided with fittings shaped to receive the legs of a table extension. When the work table was pivoted to a position in which it was parallel to the quill spindle, the table extension could be added to increase the effective length of the work surface. However, such an accessory increases the overall expense of the tool, and requires closely toleranced parts to minimize the likelihood that the work surface of the table extension would be positioned slightly above or below the work surface of the work table.

Accordingly, there is a need for a multipurpose woodworking tool capable of performing both vertical drill press and under-the-table shaping functions, and which includes a table assembly which includes a relatively long dimension in a direction parallel to the way tubes, preferably exceeding the relatively small dimensions of a table capable of pivoting 180°. Furthermore, such a table should be relatively simple to adjust, and should not include structure which would greatly increase the overall expense of fabricating the tool.

SUMMARY OF THE INVENTION

The present invention includes a table assembly preferably used in combination with a multipurpose woodworking tool of the type in which a headstock having a motor-driven quill spindle is mounted on a pair of parallel way tubes that are supported on a frame such that they are capable of being pivoted about their ends to a vertical position. The table assembly includes a table top, a pivot mount attached to the underside of the table top, a pair of support legs, and a carriage, mounted on the way tubes, having channels for receiving the support legs. Each support leg includes racks located on opposite sides thereof and extending in a longitudinal direction, and the carriage includes pinion gears which mesh with the sets of racks and are rotated by a crank assembly including a locking mechanism.

The table top includes a transverse slot and is dimensioned such that the slot is spaced from one transverse edge a distance sufficient to place it in registry with the quill spindle when the table is pivoted to place that edge adjacent the carriage or way tubes. The table is dimensioned such that the distance from the slot to an opposite edge exceeds this distance permitting the table to pivot only to 45° before striking the way tubes, thereby providing a larger working surface. In order to adjust the tool to a vertical drill press mode, the way tubes are pivoted to a vertical position such that the headstock is located above the table, the table pivoted to bring its work surface to a position perpendicular to and facing the rotational axis of the quill spindle, and the legs adjusted to bring the slot into registry with the quill spindle. In order to perform an under-the-table shaping operation, the way tubes are pivoted about an opposite end to place the headstock beneath the table. The support legs are then removed from the carriage, the table is reversed relative to the carriage by pivoting it 180°, and the legs reinserted into the channels, thereby meshing the racks on the opposite sides of the legs with the pinion gears. The legs are again adjusted to orient the slot relative to the quill spindle.

As a result of this reversible feature, the table top need only be capable of being pivoted from a position parallel to the way tubes to a position perpendicular to the way tubes in one direction, thereby allowing the opposite side of the table to be extended in length which limits the pivoting movement of the table in the opposite direction. The area of the support surface of the table is substantially increased in the region needed to support the rip fence and rip wider stock.

Accordingly, it is an object of the present invention to provide a table assembly used in combination with a multipurpose woodworking tool which permits the tool to be operated in a drill press mode or in an under-the-table shaping mode; a table assembly which is reversible in orientation relative to a support carriage; and a table which has a relatively simple construction and, therefore, is relatively inexpensive to manufacture.

Other objects and advantages of the invention will become apparent from the following description, the accompanying drawings and the appended claims.

BRIEF DESCRIPTION OF THE DRAWINGS

FIG. 7 is a detail showing the yoke locking mechanism and in which the yoke and upright member are partially broken away;

FIG. 8 is a detail perspective view showing the multipurpose tool and table system of FIG. 1 positioned to perform an under-the-table shaping operation;

FIG. 9 is a detail perspective view showing the multipurpose tool and table system of FIG. 1 adjusted to perform a vertical drill press operation.

DESCRIPTION OF THE PREFERRED EMBODIMENT

Figure 1:
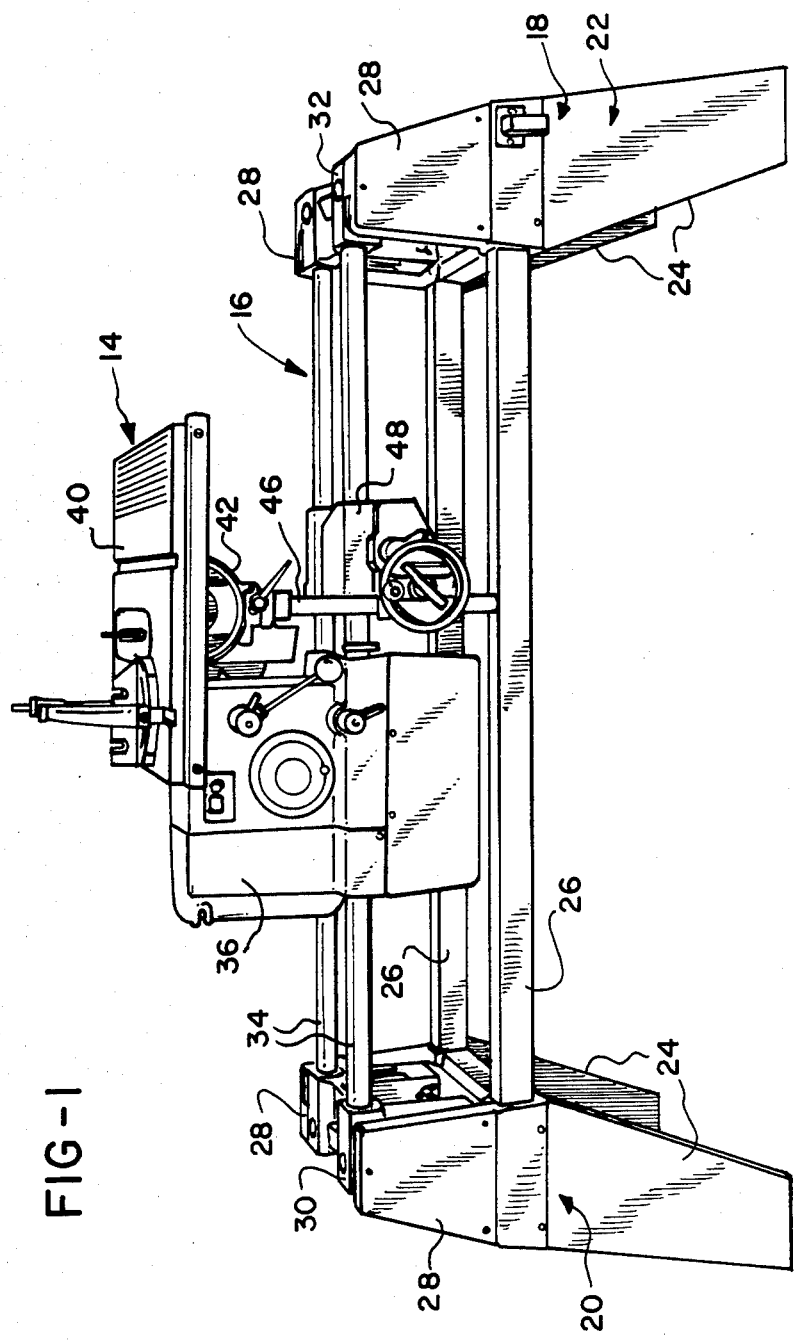
FIG. 1 is a perspective view of a multipurpose woodworking tool incorporating a preferred embodiment of the reversible table system of the present invention.
Figure 2:
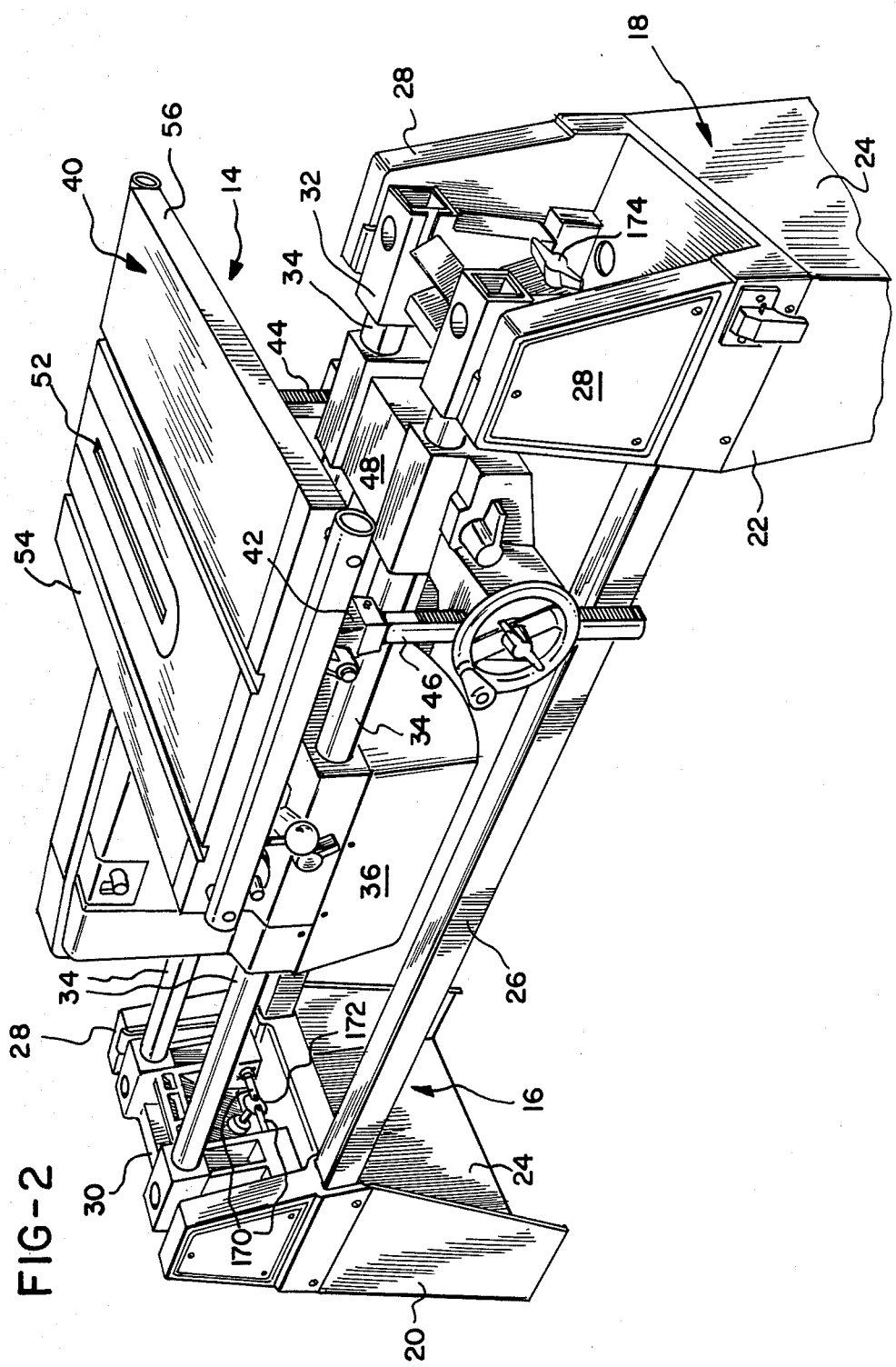
FIG. 2 is a detail in perspective of the multipurpose woodworking tool and reversible table system shown in FIG. 1.

As shown in FIGS. 1 and 2, the table assembly of the present invention, generally designated 14, is adapted to be used in combination with a multipurpose woodworking tool, generally designated 16. The woodworking tool 16 consists of a frame 18 having ends 20, 22, each having leg 24 and joined together by a pair of rails 26. Each of the ends 20, 22 include pairs of upright members 28 that support end yokes 30, 32 which are joined together by a pair of parallel way tubes 34.

A headstock 36 having a motor-driven quill spindle 38 (FIG. 9) is mounted on the way tubes 34 and can be adjustably positioned thereon. The quill spindle 38 is rotatably mounted within the headstock 36 and is oriented to rotate about an axis A which is substantially parallel to the way tubes 34. The internal structure and operation of the headstock 36 is set forth in greater detail in Edgemond, Jr., et al. U.S. Pat. No. 2,927,612, the disclosure of which is incorporated herein by reference. It is understood that other types of headstocks having the same general characteristics as the headstock 36 may be employed and not depart from the scope of the invention.

Table Assembly

The table assembly 14 comprises a table 40 attached to a pivot 42. The pivot 42 is attached to a pair of support legs 44, 46 which engage a carriage 48 slidably mounted on the way tubes 34.

The table 40 is substantially rectangular in shape and includes a planar table surface 50. The table surface 50 includes a transverse slot 52 which, as shown in FIG. 9, is parallel to and spaced a distance B from a transverse edge 54 of the table 40 which is equal to or preferably slightly less than a distance B' from the rotational axis A of the quill spindle 38 to the upper surface of the carriage 48. Slot 52 is spaced from the opposite transverse edge 56 a distance C which is greater than the distance B or B', as shown best in FIG. 3.

Figure 3:
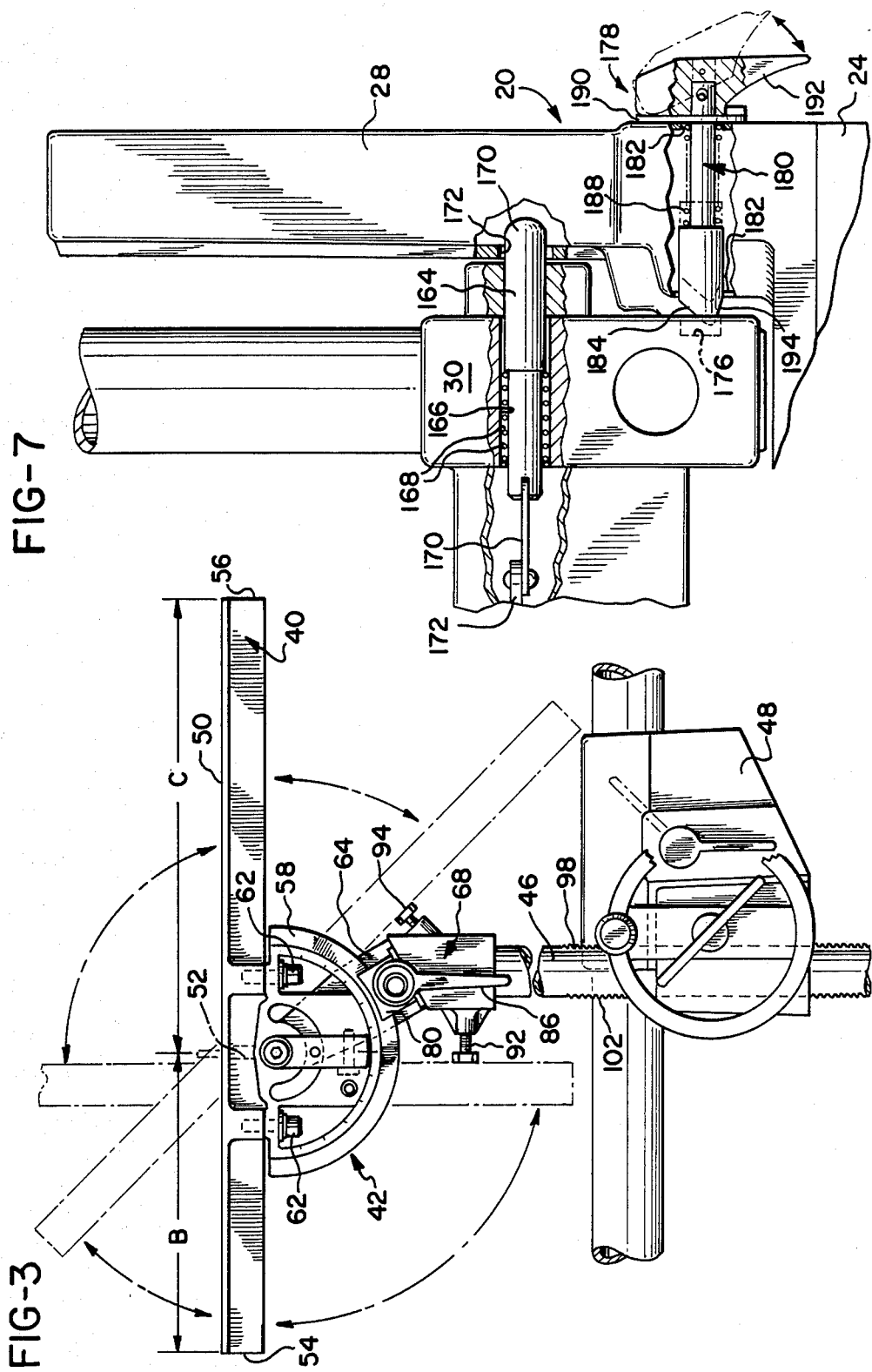
FIG. 3 is a detail side elevation of the reversible table system shown in FIG. 1.
Figure 4:
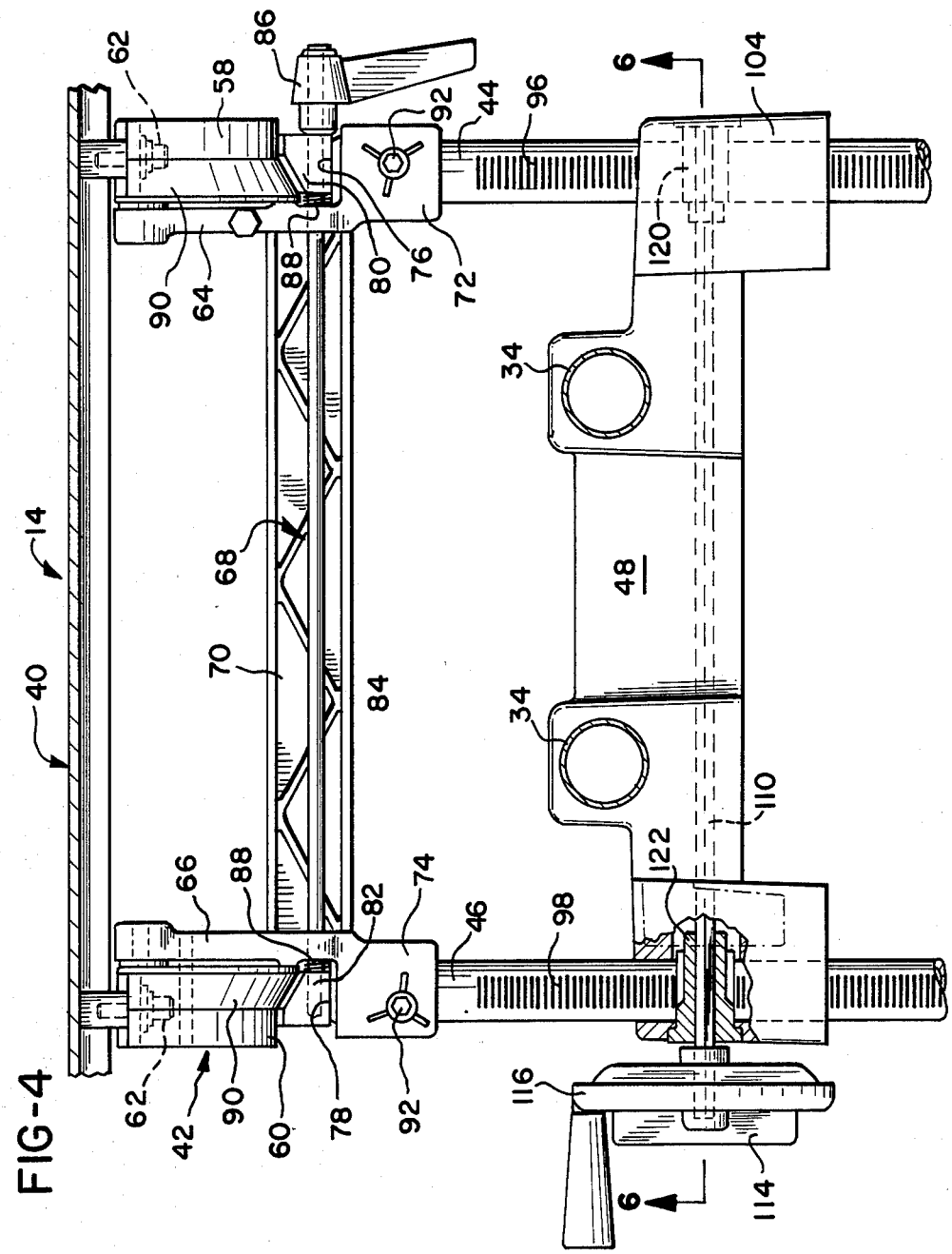
FIG. 4 is a detail end elevation of the system shown in FIG. 3 in which the table top is in section and partially broken away, and the carriage is broken away.

The pivot 42, best shown in FIGS. 3 and 4, includes a pair of semicylindrical trunnions 58, 60 which are attached to the underside of the table 40 by cap screws 62. The trunnions 58, 60 are journalled into the arms 64, 66, respectively, of a tie bar, generally designated 68 and pivot relative thereto about an axis transverse to the table top 50. The arms 64, 66 are joined together by a cross bar 70, and each includes base members 72, 74 which receive the upper ends of the support legs 44, 46, respectively.

Base members 72, 74 each include upper bearing surfaces 76, 78, oriented substantially horizontally, which support wedge blocks 80, 82, respectively. Wedge block 82 is fixedly threaded onto a rod 84 which passes through arms 64, 66 and is rotatably journalled through wedge block 80. An end of the rod 84 opposite wedge block 82 is threaded into a handle 86 so that rotation of the handle causes a displacement thereof relative to the rod 84. Wedge blocks 80, 82 are biased outwardly from their respective arms 64, 66 by coil springs 88 seated in the arms.

When positioned as shown in FIG. 4, the trunnions 58, 60 and table 40 are freely pivotable relative to the tie bar and the remainder of the table assembly 14. To lock the table in a predetermined position, the handle 86 is rotated to displace it inwardly relative to rod 84 and draw the wedge blocks 80, 82 toward each other. The wedge blocks 80, 82 slide relative to bearing surfaces 76, 78, respectively, to engage the frusto-conical surfaces 90 of the trunnions 58, 60. To release the table 40 and trunnions 58, 60, the handle 86 is rotated in an opposite direction which allows the springs 88 to urge the wedge blocks 80, 82 outwardly from the arms 64, 66 and frusto-conical surfaces 90 of the trunnions, thereby releasing the trunnions and table for pivotal movement.

As shown in FIG. 3, the tie bar 68 includes a stop 92 which contacts the underside of the table 40 when pivoted to a position in which it is substantially parallel to support legs 44, 46. Stops 94 (only one of which is shown in FIG. 3) extend outwardly from the base members 72, 74 to contact the table 40 when pivoted in an opposite direction approximately 45° from a position perpendicular to support legs 44, 46.

The operation and structure of the pivot 42 is described more fully in copending application Ser. No. 531,978, filed Sept. 14, 1983, the disclosure of which is incorporated herein by reference. It is understood that other forms of pivot assemblies may be employed without departing from the scope of the invention, such as, for example, the pivot assembly disclosed in Parker et al. U.S. Pat. No. 3,282,309, the disclosure of which incorporated herein by reference.

As shown in FIGS. 3, 4, 5 and 6, the support legs 44, 46 are substantially tubular in shape and include forward toothed racks 96, 98, respectively, extending along one side thereof, and rearward toothed racks 100, 102, respectively, extending along opposite sides thereof. Racks 96, 98, 100, 102 are formed in support legs 44, 46 to be parallel to each other and to face the yokes 30, 32 (FIGS. 1 and 2) when the legs are engaged by the carriage 48.

The carriage 48 includes a housing 104 having vertical, tubular channels 106, 108 which receive the support legs 44, 46, respectively. An axle 110 having a square cross section includes a threaded end 112 which is attached to a wing nut 114. A hand wheel 116 is slidably mounted on the axle 110 adjacent to the wing nut 114 and includes a square opening 118 shaped to engage the axle such that rotation of the hand wheel effects rotation of the axle.

A pair of pinion gears 120, 122 are slidably mounted on the axle 110 and are journalled into housing 104. Pinion gears 120, 122 include frusto-conical wedge portions 124 on outboard sides thereof. A snap ring 126 is fitted on an end of the axle 110, and pinion gear 120 is urged against it by a coil spring 128. Coil spring 128 is seated against snap ring 130. Similarly, wedge 124 is urged against hand wheel 116 by spring 132 which is seated against snap ring 134. The snap rings 126, 130, and 134 are all seated within annular grooves (not shown) formed on the axle 110.

Pinion gears 120, 122 each include square bores which are shaped to receive the axle 110 such that rotation of the axle 110 effects rotation of the pinion gears 120, 122. To raise and lower the support legs 44, 46, pivot 42 and table 40, the hand wheel 116 is rotated, thereby rotating the axle 110 and pinion gears 120, 122 which mesh with the forward racks 96, 98 of the support legs 44, 46. To lock the legs 44, 46 to the carriage 48, wing nut 114 is rotated in a clockwise direction such that it urges the hand wheel 116 against pinion 122 and draws pinion 120 toward leg 44. This causes the frusto-conical wedge portions 124 of pinion gears 120, 122 to lock against the support legs 44, 46, respectively, thereby preventing relative motion between the pinions and legs. To release the legs 44, 46, wing nut 114 is rotated in a counterclockwise direction, thereby displacing itself away from the pinions 120, 122 and allowing springs 128, 132 to urge pinions 120, 122 outwardly, thereby removing the contact between the legs and the frusto-conical wedge portions 124.

Figure 5:
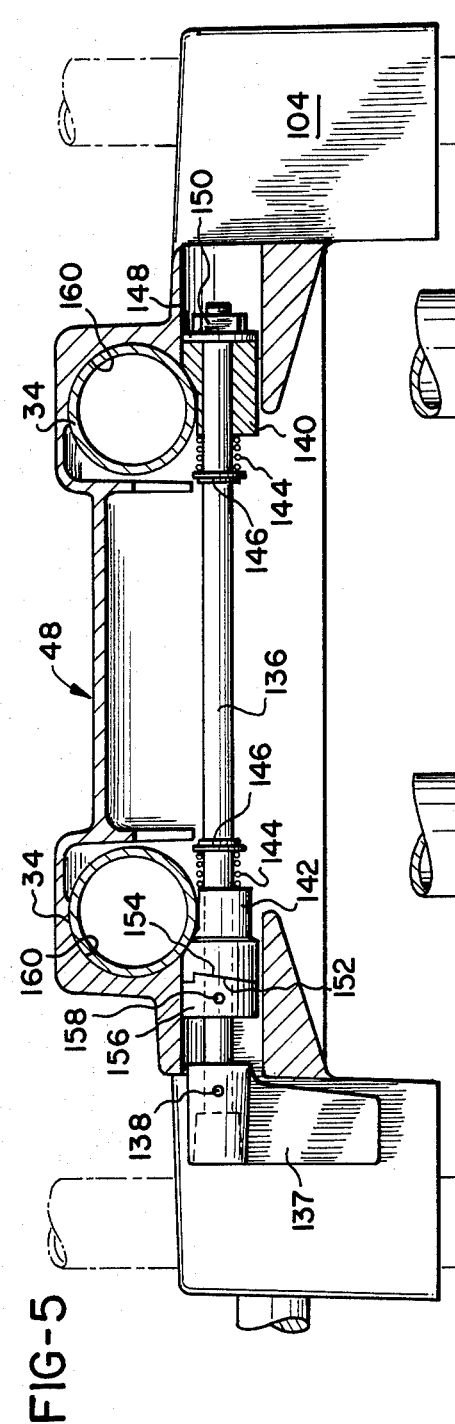
FIG. 5 is a bottom plan view in section of the table support carriage, taken at line 5—5 in FIG. 6.
Figure 6:
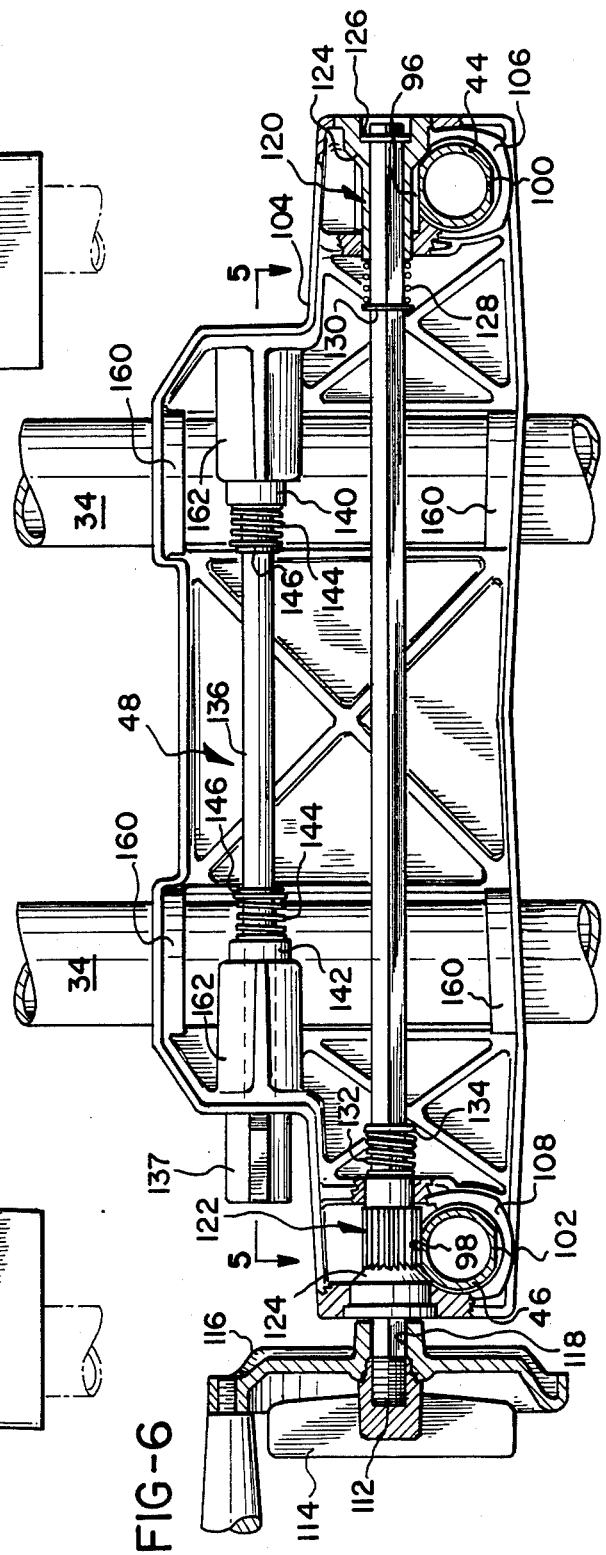
FIG. 6 is a bottom plan view in section of the table support carriage, taken at line 6—6 in FIG. 4.

The carriage 48 also includes means for locking the carriage against the way tubes 34, shown in FIGS. 5 and 6. The locking mechanism includes a rod 136 having a lever 137 attached at an end by a pin 138. Wedges 140, 142 are journalled onto the rod 136 and are urged outwardly by spring 144 seated against snap rings 146. Wedge 140 is retained on the rod 136 by a washer 148 and nut 150 threaded on an end of the rod. Wedge 142 includes a helical cam surface 152 which matingly engages a similarly shaped cam surface 154 on an annular member 156 which is retained on the rod 136 by a pin 158.

Way tubes 34 extend through vertical channels 160 formed through the housing 104 of the carriage 48, and wedges 140, 142 are journalled in bosses 162 (FIG. 6) so that they are positioned adjacent to the way tubes. To lock the carriage 48 against the way tubes 34, lever 137 is rotated in a clockwise direction, causing cam surface 154 to slide against cam surface 152 and urge wedge 142 against its adjacent way tube 34. Continued rotation of the handle 137 draws the rod 136 to the left as shown in FIG. 5 to urge wedge 140 against its adjacent way tube 34. Frictional engagement between cam surfaces 152, 154 prevents the carriage 48 from inadvertently unlocking. To release the carriage from its locked position, the lever 137 is rotated in a counterclockwise direction, thereby allowing the wedges 140, 142 to move outwardly away from locking engagement with their respective way tubes 34.

In the preferred embodiment of the invention, the table assembly 14 is used in combination with a woodworking tool 16 in which the way tubes 34 are capable of being pivoted about either end to a substantially vertical position as shown in FIGS. 8 and 9. The structure enabling the way tubes 34 to be pivoted to a substantially vertical position is shown in FIGS. 1, 2, 7, 8 and 9, and is described in complete detail in copending Legler et al. application Ser. No. 552,586, filed Nov. 16, 1983, the disclosure of which is incorporated herein by reference. Other types of pivoting way tube and frame assemblies may be employed to achieve the same result, such as that disclosed in the aforementioned Parker et al. U.S. Pat. No. 3,282,309, without departing from the scope of the invention.

This structure will be described with reference to the end 20 of the frame 18, it being understood that the structure at end 22 is identical. As shown in FIGS. 7, 8 and 9, the yoke 30 includes a pair of pins 164 (only one of which is shown in FIGS. 7, 8 and 9) slidably mounted within a passageway 166 and urged outwardly by a coil spring 168 seated within the passageway. An outer end 170 of the pins protrudes from the yoke 30 and is journalled into holes 172 formed in the pair of upright members 28. Inner ends of the pins 164 are attached to links 170 (also shown in FIG. 2) which in turn are pivotally connected to a disk 172. Disk 172 is connected to a handle 174 (shown in FIG. 2 for yoke 32 at end 22), and rotation of the handle draws the pins 164 inwardly, thereby disengaging them from upright members 28. Once the pins 164 of yoke 30 have been disengaged from the upright members 28, that end of the way tubes 134 can be elevated relative to the frame 18 by pivoting the yoke 32 about its pins, which remain journalled into upright members 28 at end 22.

Yokes 30, 32 are provided with notches 176 which are positioned to engage bullet catches 178 (FIGS. 7, 8 and 9) and thereby lock the way tubes 34 in a vertical position when tilted. Bullet catches 178 each include a pin 180 slidably mounted within a passage 182 formed in the upright members 28, having an angled nose 184 at an inner end and an outer end 186 which protrudes from the upright members. The pin 180 is urged inwardly by a spring 188 which is seated against a cover plate 190. Outer end 186 is pivotally attached to a lever 192 which is positioned to pivot against cover plate 190 when drawn outwardly.

As the way tubes are pivoted about pins 164 of one of the yokes 30, 32, the nose 184 of the pin 180 contacts the immediately adjacent portion of the yoke 30 (as shown in FIG. 7) which urges the pin outwardly until the nose is in registry with notch 176. At this time, the spring 188 urges the nose 184 inwardly, and the underside 194 of nose 184 is angled less sharply and thereby prevents the nose from being urged outwardly by pressure from the yoke 30. To release the yoke 30, the lever 192 is pulled outwardly to the position shown in phantom in FIG. 7, thereby urging the pin 180 outwardly to disengage the nose 184 from the notch 176.

Adjustment of the Table Assembly

Figure 10:
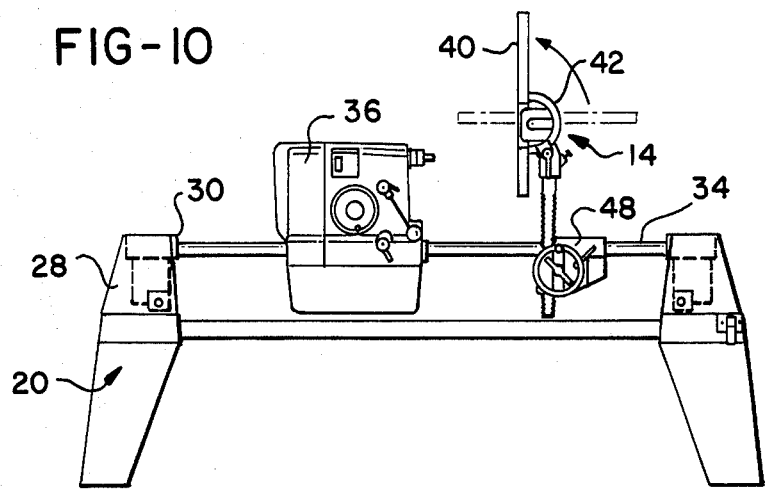
FIGS. 10, 11, 12 and 13 are somewhat schematic side elevations of a multipurpose woodworking tool incorporating the reversible table system shown in FIG. 1 in a sequence of adjustments from a position for performing a table sawing operation, to a vertical drill press position, and to an under-the-table shaping position.
Figure 11:
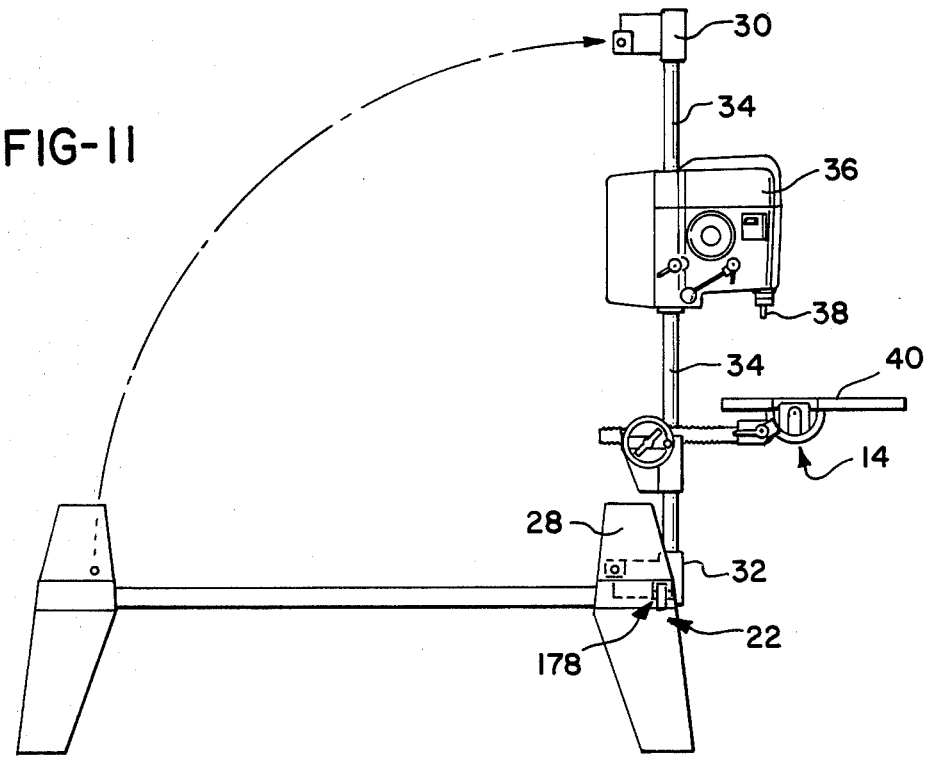

A primary advantage of the table assembly 14 is that it enables a multipurpose woodworking tool 16 to which it is attached to be adjusted to function as a vertical drill press, as shown in FIG. 9, or adjusted to function as an under-the-table shaper, as shown in FIG. 8. Starting with the table assembly 14 and tool 16 in the configuration shown in FIGS. 1 and 2, the table and tool are adjusted to assume the vertical drill press configuration shown in FIG. 9 by first tilting the table 40 to a plane which is substantially perpendicular to the way tubes 34, as shown in FIG. 10. It may be necessary as a preliminary step to displace the carriage 48 away from the headstock 36 to enable the table to be pivoted to this position. The pivot 42 is locked in the manner previously described, and yoke 30 is disengaged from upright members 28 at end 20. The way tubes 34 and yoke 30 are lifted upwardly, thereby pivoting yoke 32 relative to the upright members 28 of end 22, as shown in FIG. 11. The way tubes 34 are held in this vertical position by the bullet catch 178 associated with end 22.

If necessary, table 40 can be adjusted relative to the quill spindle 38 and way tubes 34 such that the slot 52 (FIG. 9) is immediately below the quill spindle. This may be necessary to allow a drilling operation in which the drill bit (not shown) must pass entirely through a workpiece supported on the table surface 50.

Starting from the configuration shown in FIGS. 1 and 2, the table assembly 14 and tool 16 are adjusted to assume the configuration shown in FIG. 8 by first adjusting the pivot 42 so that the table 40 is oriented in a plane which is perpendicular to the way tubes 34 as shown in FIG. 10. The wing nut 114 of carriage 48 is rotated in a counterclockwise direction to release the legs 44, 46 (FIG. 6) from locking engagement with the carriage, and the legs are displaced upwardly until they are completely removed from the channels 106, 108.

Figure 12:
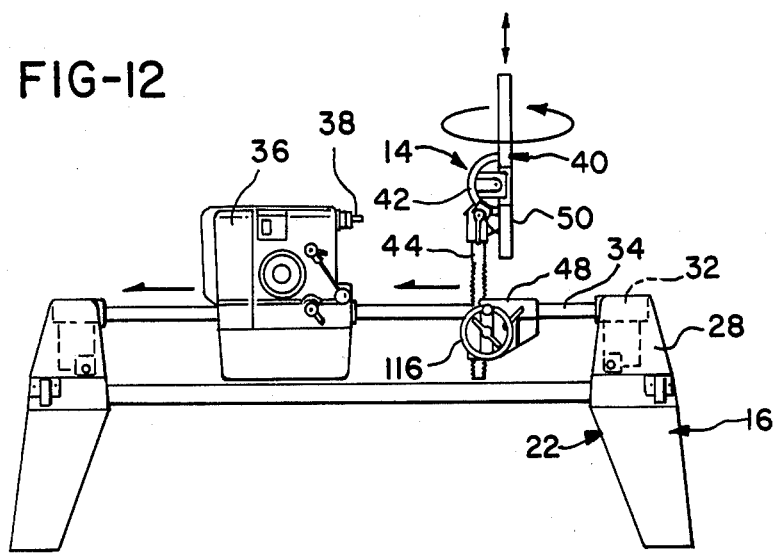

The table is then rotated 180° so that the table surface 50 faces away from the headstock 36, as shown in FIG. 12. The legs 44, 46 are then reinserted into the channels 106, 108, respectively, such that the pinion gears 120, 122 now mesh with rearward racks 100, 102, respectively; that is, support leg 44 is now inserted in channel 108 and support leg 46 is now in channel 106. The legs 44,46 are locked to the carriage 48.

Figure 13:
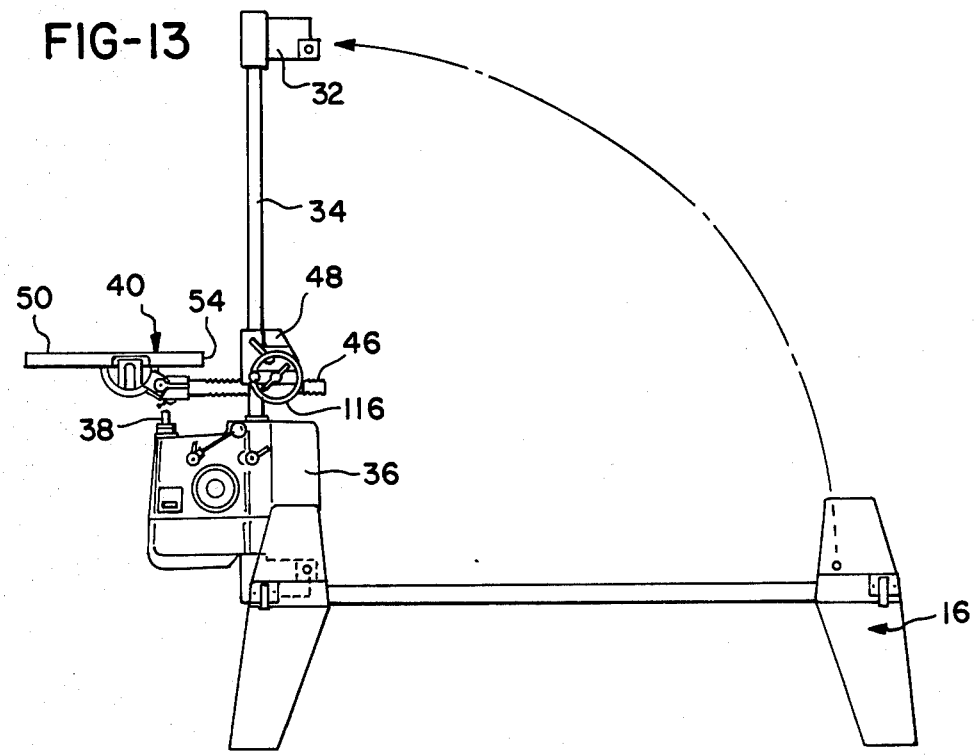

The pins associated with yoke 32 are disengaged from adjacent upright members 28 of end 22, and that end is elevated until the way tubes 34 assume the vertical position shown in FIG. 13. The headstock 36 and carriage 48 may be displaced downwardly along the way tubes 34 as shown in FIG. 13 so that the table surface 50 is at a height above the floor which is convenient for a user. The support legs 44, 46 are unlocked from the carriage 48 and rotation of the hand wheel 116 displaces the table 40 relative to the way tubes 34 and headstock 36. The table 40 can be positioned such that the slot 52 is in registry with the quill spindle 38 of the headstock 36, enabling a shaping tool fitted on the quill spindle to protrude upwardly through the slot.

Since the distance from the slot 52 to the edge 54 is slightly less than the distance from the quill spindle axis to the top of the carriage 48, there is sufficient clearance to position the quill spindle and a shaping tool within the slot 52, as shown in FIG. 8. At this time, a work guide 194 of well-known construction may be attached to the table top 50 to guide a workpiece past the shaping tool.

By providing forward racks 96, 98, and rearward racks 100, 102 on the support legs 44, 46, the table 40 and pivot 42 may be reversed in orientation relative to the headstock to enable the table to be pivoted so that its surface 50 faces away from the headstock 36 and the headstock can be positioned below the table to perform an under-the-table shaping operation. This allows the surface area of the table surface 50 to be enlarged beyond that of prior art tables which are capable of being pivoted 180° so that both of their transverse edges may be placed adjacent the way tubes and/or carriage of the associated tool.

While the form of apparatus herein described constitute a preferred embodiment of the invention, it is to be understood that the invention is not limited to this precise form of apparatus, and that changes may be made therein without departing from the scope of the invention.

What is claimed is:

1. For use with a multipurpose tool of the type having a frame including a pair of way tubes, and a headstock having a motor-driven quill spindle slidably mounted thereon, a table assembly comprising:
    a plate-shaped table top;
    pivot means attached to an underside of said table top;
    a pair of parallel support legs attached to and extending from said pivot means, each of said support legs having rack means extending along opposing longitudinal sides thereof; and
    a carriage adapted to be mounted slidably on a pair of parallel way tubes and having means for receiving and supporting said legs, said receiving means including pinion means engaging said rack means, and means for rotating and locking said pinion means relative to said rack means such that said table top may be displaced relative to said carriage, whereby said support legs may be removed from said receiving means, thereby disengaging said rack means from said pinion means, said table top and said legs reversed in orientation relative to said carriage, and said legs reinserted in said receiving means whereby said rack means re-engages said pinion means.

2. The table assembly of claim 1 wherein said receiving means includes a pair of channels formed in said carriage for receiving said legs therethrough; and said pinion means includes a pair of pinion gears, each associated with a different one of said channels for meshing with an adjacent portion of said rack means.

3. The assembly of claim 1 wherein said pivot means includes a pivot axis extending transversely of said table top such that said table top may be pivoted to lie in a plane parallel to a plane containing said legs.

4. The assembly of claim 3 wherein said table top includes a transverse slot therethrough adapted to receive a tool mounted on an output spindle of an associated headstock, said slot spaced from a first transverse edge of said table to a first distance substantially equal to the distance between a top of said carriage and an output spindle of an associated headstock.

5. The assembly of claim 4 wherein said table top includes a second transverse edge, opposite said first transverse edge and spaced from said slot a second distance greater than that from said slot to said first edge.

6. The assembly of claim 5 wherein said second distance equals a distance from said slot to said way tubes when said table top is pivoted 45° from a position parallel to said way tubes.

7. The assembly of claim 5 wherein said legs are tubular in shape; and said rack means includes a pair of toothed racks extending along opposing sides of each of said legs.

8. In a multipurpose tool of the type having a frame, a pair of parallel way tubes mounted on said frame, and a headstock slidably mounted on said tubes, said headstock having a motor-driven quill spindle spaced from and parallel to said tubes, a table assembly comprising:
 a table top;
 pivot means attached to an underside of said table top;
 a pair of parallel support legs attached to and extending from said pivot means, each of said legs having rack means extending along opposing longitudinal sides thereof; and
 a carriage slidably mounted on said way tubes and having means for receiving and supporting said legs, said receiving means including pinion means for engaging said rack means and means for rotating and locking said pinion means relative to said rack means, whereby said support legs may be disengaged from said receiving means, said table top and legs reversed in orientation relative to said carriage and said headstock, and said legs re-engaged with said receiving means.

9. The tool of claim 8 wherein said receiving means includes a pair of holes, each shaped to receive one of said legs.

10. The tool of claim 9 wherein said pivot means defines a pivot axis which extends transversely of said table top and said way tubes, such that said table top may be pivoted in a tilted mode to lie in a plane perpendicular to a rotational axis of said quill spindle.

11. The tool of claim 10 wherein said table top includes first and second transverse edges at opposite ends thereof; and a transverse slot therethrough shaped to receive a tool mounted on said quill spindle therethrough and spaced from said first transverse edge a distance less than a clearance distance from a top of said carriage to said quill spindle, and spaced from said second edge a distance greater than said clearance distance.

12. The tool of claim 11 wherein said legs are tubular in shape; and said rack means includes a pair of rack members extending along opposing sides of each of said legs.

13. The tool of claim 12 further comprising means for pivotally attaching said way tubes to said frame such that said tubes may be pivoted about ends thereof to a substantially vertical position, and said table top positioned in said tilted mode such that said headstock is above said table top, whereby said tool is in a vertical drill press mode; and about opposite ends of said tubes to a substantially vertical position such that said headstock is below said table top, whereby said tool is in an under-the-table shaping mode.

14. In a multipurpose tool of the type having a frame, a pair of parallel way tubes mounted on said frame, and a headstock slidably mounted on said tubes, said headstock having a motor-driven quill spindle spaced from and parallel to said tubes, the improvement comprising:
 a plate-shaped table top;
 pivot means attached to an underside of said table top and defining a pivot axis which extends transversely of said table top and said way tubes; such that said table top may be pivoted in a tilted mode to lie in a plane perpendicular to a rotational axis of said quill spindle;
 a pair of parallel, cylindrically-shaped support legs attached to and extending downwardly from said pivot means, each of said legs having a pair of toothed racks extending along opposing longitudinal sides thereof;
 a carriage slidably mounted on said way tubes and having a pair of channels spaced transversely thereof and shaped to receive said support legs therethrough, and a pair of pinion gears associated with said holes, each positioned to mesh with one of said racks on an associated one of said legs whereby said legs may be removed from said holes so that said racks disengage said pinions, said table and legs reversed relative to said carriage, and said legs reinserted into said holes so that opposite ones of said racks engage said pinions;
 crank means for rotating and selectively locking said pinion gears to displace said table top relative to said carriage;
 said table top having first and second transverse edges at opposite ends thereof, and a transverse slot therethrough shaped to receive a tool mounted on said quill spindle and spaced from said first edge a distance less than a clearance distance from a top of said carriage to said quill spindle, and spaced from said second edge a distance greater than said clearance distance; and
 means for pivotally attaching said way tubes to said frame such that said tubes may be pivoted about ends thereof to a substantially vertical position and said table top pivoted to said tilted mode such that said headstock is above said table top, whereby said tool is in a vertical drill press mode; and said tubes may be pivoted about opposite ends thereof to a substantially vertical position and said table top and legs reversed in orientation relative to said carriage such that said headstock is below said table top, whereby said tool is in an under-the-table shaping mode.

* * * * *

UNITED STATES PATENT AND TRADEMARK OFFICE
CERTIFICATE OF CORRECTION

PATENT NO. : 4,510,980

DATED : April 16, 1985

INVENTOR(S) : Robert L. Bartlett; Robert N. McKee

It is certified that error appears in the above-identified patent and that said Letters Patent is hereby corrected as shown below:

Column 5, line 66, "spring" should be --springs--.

Column 9, line 3, "said table to" should be --said table top--.

Signed and Sealed this

Twenty-fourth Day of September 1985

[SEAL]

Attest:

Attesting Officer

DONALD J. QUIGG

Commissioner of Patents and
Trademarks—Designate